(12) United States Patent
Yoon et al.

(10) Patent No.: US 9,379,885 B2
(45) Date of Patent: Jun. 28, 2016

(54) METHOD OF CREATING ALTBOC CORRELATION FUNCTION, METHOD OF TRACKING ALTBOC SIGNAL, AND SYSTEM FOR TRACKING ALTBOC SIGNAL

(71) Applicant: Research & Business Foundation SUNGKYUNKWAN UNIVERSITY, Suwon-Si (KR)

(72) Inventors: Seokho Yoon, Suwon-si (KR); Keunhong Chae, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/725,441

(22) Filed: May 29, 2015

(65) Prior Publication Data

US 2015/0349946 A1 Dec. 3, 2015

(30) Foreign Application Priority Data

May 30, 2014 (KR) ........................ 10-2014-0065879

(51) Int. Cl.
*H04L 27/06* (2006.01)
*H04L 7/04* (2006.01)
*H04L 27/26* (2006.01)
*G01S 19/24* (2010.01)

(52) U.S. Cl.
CPC ................. *H04L 7/042* (2013.01); *G01S 19/24* (2013.01); *H04L 27/2657* (2013.01)

(58) Field of Classification Search
CPC ................. H04B 1/707; H04B 1/7085; H04B 2201/7015; H04L 27/363; H04L 7/042; H04L 27/2657; G01S 19/14; G01S 19/29; G01S 19/30; G01S 19/39; G01S 19/01; G01S 19/24
See application file for complete search history.

(56) References Cited

U.S. PATENT DOCUMENTS

| 2005/0012664 | A1* | 1/2005 | Gerein | G01S 19/29 342/357.74 |
| 2007/0201537 | A1* | 8/2007 | De Wilde et al. | H04L 27/22 375/147 |
| 2008/0094280 | A1* | 4/2008 | Fenton | G01S 19/30 342/357.31 |
| 2009/0103656 | A1* | 4/2009 | Chen | G01S 19/30 375/329 |

(Continued)

FOREIGN PATENT DOCUMENTS

| KR | 10-2013-0046667 A | | 5/2013 |
| KR | 20130046667 A | * | 5/2013 |
| KR | 10-1381104 B1 | | 3/2014 |

OTHER PUBLICATIONS

A Novel Multipath Mitigation Scheme for AltBOC signal, by Junghyuck Lee, Seungsoo Yoo and Sung Yong Kim. 2010.*

(Continued)

*Primary Examiner* — Syed Haider
(74) *Attorney, Agent, or Firm* — NSIP Law

(57) ABSTRACT

There is provided a method of creating an AltBOC correlation function that includes: receiving an AltBOC signal by a receiver; analyzing a subcarrier of the AltBOC signal into eight partial subcarriers having the same period by the receiver; creating partial correlation functions by correlating each of the eight partial subcarriers with the AltBOC signal by the receiver; and creating a resultant correlation function by combining the partial correlation functions by the receiver.

13 Claims, 8 Drawing Sheets

(56) References Cited

U.S. PATENT DOCUMENTS

2010/0104046 A1* 4/2010 Hodgart .................. G01S 19/30
375/340
2011/0261805 A1* 10/2011 Landry .................. G01S 19/24
370/342

OTHER PUBLICATIONS

Lee, Junghyuck, et al. "A Novel Multipath Mitigation Scheme for AltBOC Signal" The Korean Institute of Communications and Information Sciences 2010 Summer Conference, Jun. 2010, pp. 1079-1080.

* cited by examiner

METHOD OF CREATING ALTBOC CORRELATION FUNCTION, METHOD OF TRACKING ALTBOC SIGNAL, AND SYSTEM FOR TRACKING ALTBOC SIGNAL

CROSS-REFERENCE TO RELATED APPLICATIONS

This application claims the benefit under 35 USC 119 (a) of Korean Patent Application No. 10-2014-0065879 filed on May 30, 2014, in the Korean Intellectual Property Office, the entire disclosure of which is incorporated herein by reference for all purposes.

BACKGROUND

1. Field

The following description relates to a method of creating an AltBOC correlation function with side peaks removed for synchronizing AltBOC signals, a method of tracking an AltBOC signal using the correlation function, and a system for tracking an AltBOC signal using the correlation function.

2. Description of the Related Art

A BOC (binary offset carrier) signal is used for modulation in a next generation GNSS (global navigation satellite system) such as Galileo and GPS III.

A time error generated in synchronization may turn out a serious position error in the GNSS. Accordingly, it is very important to synchronizing signals for reliable GNSS-based communication.

Meanwhile, there are various BOC signals and an AltBOC signal is applied to COMPASS B2ab and Galileo E5ab in several GNSSs.

SUMMARY

There is provided a method of creating an AltBOC correlation function that includes: receiving an AltBOC signal by a receiver; analyzing a subcarrier of the AltBOC signal into eight partial subcarriers having the same period by the receiver; creating partial correlation functions by correlating each of the eight partial subcarriers with the AltBOC signal by the receiver; and creating a resultant correlation function by combining the partial correlation functions by the receiver.

In the creating of a resultant correlation function, the receiver creates a correlation function with side peaks removed, by combing partial correlation functions, which are bilaterally symmetrical, in the partial correlation functions.

There is also provided a method of tracking an AltBOC signal that includes: receiving an AltBOC signal by a receiver; analyzing a subcarrier of the AltBOC signal into eight partial subcarriers having the same period by the receiver; creating partial correlation functions by correlating each of the eight partial subcarriers with the AltBOC signal by the receiver; creating a resultant correlation function by combining the partial correlation functions by the receiver; and tracking an AltBOC signal using the resultant correlation function by the receiver.

There is also provided a system for tracking an AltBOC signal that includes: a receiver that receives an AltBOC signal; a partial correlation function creator that analyzes a subcarrier of an AltBOC signal into eight subcarriers having the same period and creates partial correlation functions by correlating the eight partial subcarriers with the AltBOC signal; a resultant correlation function creator that creates a resultant correlation function by combining the partial correlation functions; and a determiner that tracks a signal using the resultant correlation function.

Figure 1:
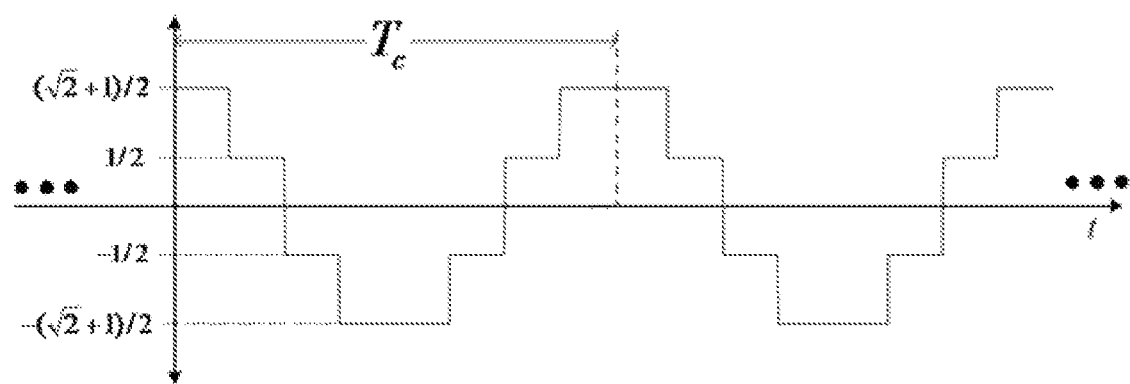
FIG. 1 is a diagram illustrating an example of a subcarrier of an AltBOC signal.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It should also be noted that in performing a method or an operating method, processes of the method may occur out of noted order unlike otherwise mentioned. In other words, the respective processes may be executed in the same order as the noted order, may be executed substantially concurrently, or may be executed in the reverse order.

The following description relates to a technique of creating a correlation function having a pointed main peak with side peaks removed to improve an ability of tracking an AltBOC signal of BOC signals. Further, the following description relates to a method and a system for tracking a signal using the created correlation function.

First, a process of creating a correlation function having a pointed main peak and a small width without side peaks of an AltBOC signal.

An AltBOC signal can be expressed as the following Equation 1.

$$g(t) = \sqrt{P} \sum_{k=-\infty}^{\infty} c_{ceil(k/8)} sc_{mod(k,8)} p_{T_c/8}\left(t - k\frac{T_c}{8}\right) d(t) \quad \text{[Equation 1]}$$

where P is signal power and d(t) is navigation data. Further, the ceil (•) function is a function for rounding up factors and mod (k, 8) is the remainder of k/8.

$sc_i sc_i$ is the value of a subcarrier of an AltBOC signal and $sc_i$ is ($\sqrt{2}$+1)/2, ½, −½, (−$\sqrt{2}$−1)/2, (−$\sqrt{2}$−1)/2, −½, ½, ($\sqrt{2}$+1)/2 when x is 0, 1, 2, 3, 4, 5, 6, and 7, respectively. $p_{T_c/8}$ is a unit square wave for [0, $T_c$/8], $T_c$ is a chip period of an PRN (pseudorandom noise), and $c_i$ is the value of the i-th PRN. Further, the frequency of the subcarrier of the AltBOC signal is 15.345 MHz. FIG. 1 is a diagram illustrating an example of a subcarrier of an AltBOC signal.

In general, a GNSS provides a specific pilot channel for time synchronization and the value of navigation data is 1 for quick and accurate synchronization in the pilot channel. The following description relates to a method of creating a correlation function used for the technology of tracking a signal assuming a pilot channel.

A subcarrier of an AltBOC signal can be expressed as the following Equation 2.

$$s(t) = \sum_{k=-\infty}^{\infty} sc_{mod(k,8)} p_{T_c/8}\left(t - k\frac{T_c}{8}\right) \quad \text{[Equation 2]}$$

A correlation function with side peaks removed is obtained by analyzing the subcarrier of the AltBOC signal into a total of eight partial subcarriers and recombining partial correlation functions created from the partial subcarriers.

The subcarrier s(t) is analyzed into a partial subcarrier $s_i(t)$ satisfying $$s(t) = \sum_{i=0}^{7} s_i(t).$$

The partial subcarrier $s_i(t)$ is expressed as the following Equation 3.

$$s_i(t) = \sum_{k=-\infty}^{\infty} sc_{i_{mod(k,8)}} p_{T_c/8}\left(t - k\frac{T_c}{8}\right) \quad \text{[Equation 3]}$$

where $sc_{i_y}$ has the values in the following Table 1, when y is 0, 1, 2, 3, 4, 5, 6, and 7.

TABLE 1

|  | y = 0 | y = 1 | y = 2 | y = 3 | y = 4 | y = 5 | y = 6 | y = 7 |
|---|---|---|---|---|---|---|---|---|
| $sc_{0_y}$ | ($\sqrt{2}$ + 1)/2 | 0 | 0 | 0 | 0 | 0 | 0 | 0 |
| $sc_{1_y}$ | 0 | 1/2 | 0 | 0 | 0 | 0 | 0 | 0 |
| $sc_{2_y}$ | 0 | 0 | −1/2 | 0 | 0 | 0 | 0 | 0 |
| $sc_{3_y}$ | 0 | 0 | 0 | (−$\sqrt{2}$ − 1)/2 | 0 | 0 | 0 | 0 |
| $sc_{4_y}$ | 0 | 0 | 0 | 0 | (−$\sqrt{2}$ − 1)/2 | 0 | 0 | 0 |
| $sc_{5_y}$ | 0 | 0 | 0 | 0 | 0 | −1/2 | 0 | 0 |
| $sc_{6_y}$ | 0 | 0 | 0 | 0 | 0 | 0 | 1/2 | 0 |
| $sc_{7_y}$ | 0 | 0 | 0 | 0 | 0 | 0 | 0 | ($\sqrt{2}$ + 1)/2 |

Figure 2:
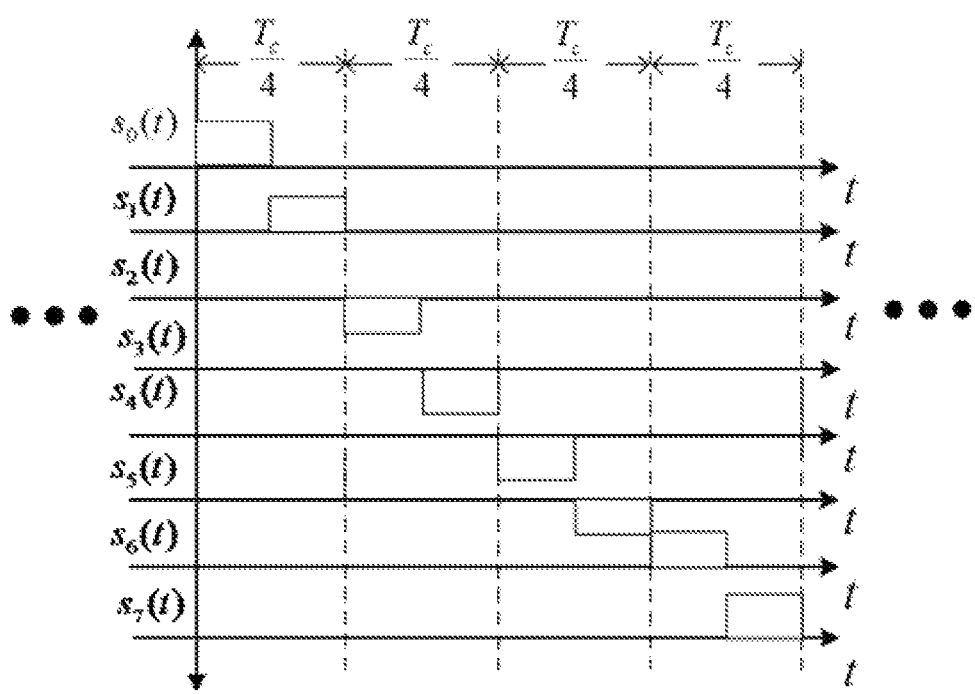
FIG. 2 is a diagram illustrating an example of partial subcarriers of an AltBOC subcarrier.

Accordingly, the partial subcarriers are illustrated an in FIG. 2. FIG. 2 is a diagram illustrating an example of partial subcarriers of an AltBOC subcarrier.

An autocorrelation function R(τ) of the AltBOC signal regularized from the partial subcarriers is expressed as the following Equation 4. In Equation 4, T is the period of a PRN.

$$R(\tau) = \frac{1}{PT}\int_0^T g(t)g(t+\tau)dt \quad \text{[Equation 4]}$$

$$= \frac{1}{PT}\sum_{i=0}^{7}\int_0^T g(t)g_i(t+\tau)dt$$

$$= \sum_{i=0}^{7} C_i(\tau)$$

where $C_i(\tau)$ is correlation between partial subcarriers that are divided local signals and the AltBOC received signal and $C_i(\tau)$ is defined as a partial correlation function. $g_i(t)$ is a signal combined by a partial subcarrier $s_i(t)$.

Figure 3:
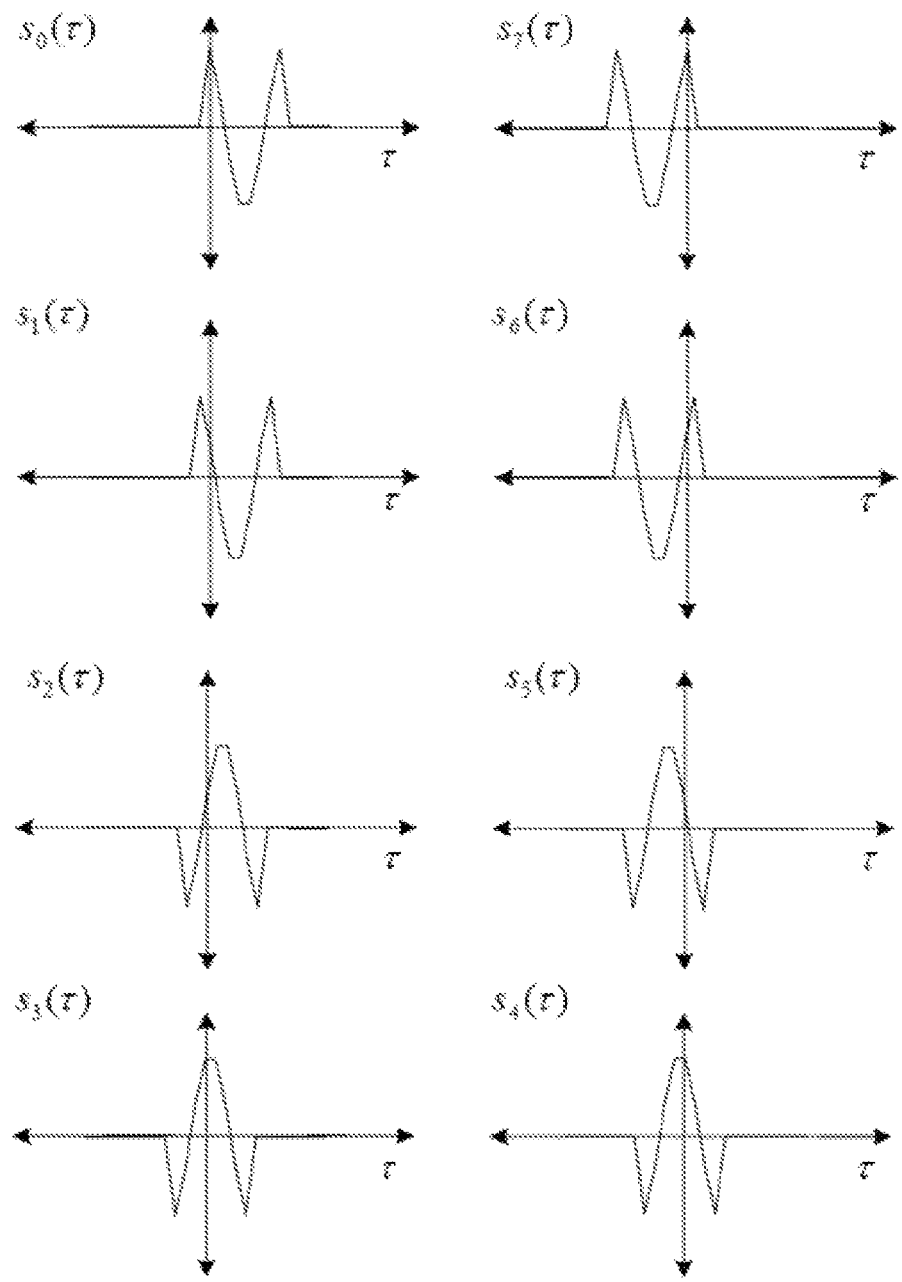
FIG. 3 is an exemplary diagram illustrating partial correlation functions between an AltBOC signal and partial subcarriers of an AltBOC subcarrier.

FIG. 3 is an exemplary diagram illustrating partial correlation functions between an AltBOC signal and partial subcarriers of an AltBOC subcarrier. It may be analyzed as correlation between a received signal including the subcarrier illustrated in FIG. 1 and a local signal including the partial subcarriers illustrated in FIG. 2.

The partial correlation functions $C_1(\tau)$ and $C_6(\tau)$ are symmetrical and $C_2(\tau)$ and $C_5(\tau)$ are also symmetrical in FIG. 3. Accordingly, it can be seen that a multiple of symmetrical partial correlation functions is zero except for the main peaks. Accordingly, a correlation function with side peaks removed can be obtained by the theorem of the following Equation 5.

$$A \odot B = |A(\tau)| + |B(\tau)| - |A(\tau) - B(\tau)| \quad \text{[Equation 5]}$$

A correlation function $R_0(\tau) = (C_1(\tau) \odot C_6(\tau)) + (C_2(\tau) \odot C_5(\tau))$ with side peaks removed can be created from Equation 5.

Further, addition calculation can be performed to increase the height of the correlation function with side peaks removed. $R_1(\tau)$, $R_2(\tau)$, $R_3(\tau)$ and $R_4(\tau)$ can be respectively obtained by correlating the correlation function $R_0(\tau)$ with side peaks removed with partial correlation functions $C_0(\tau)$, $C_3(\tau)$, $C_4(\tau)$ and $C_7(\tau)$, which can be expressed as the following Equation 6.

$$R_1(\tau) = R_0(\tau) \odot C_0(\tau),$$

$$R_2(\tau) = R_0(\tau) \odot C_3(\tau),$$

$$R_3(\tau) = R_0(\tau) \odot C_4(\tau),$$

$$R_4(\tau) = R_0(\tau) \odot C_7(\tau), \quad \text{[Equation 6]}$$

Finally, a resultant correlation function $R_{proposed}(\tau)$ can be created by summing up the created correlation functions to $R_0(\tau)$ to $R_4(\tau)$, from the following Equation 7.

$$R_{proposed}(\tau) = \sum_{i=0}^{4} R_i(\tau) \quad \text{[Equation 7]}$$

Figure 4:
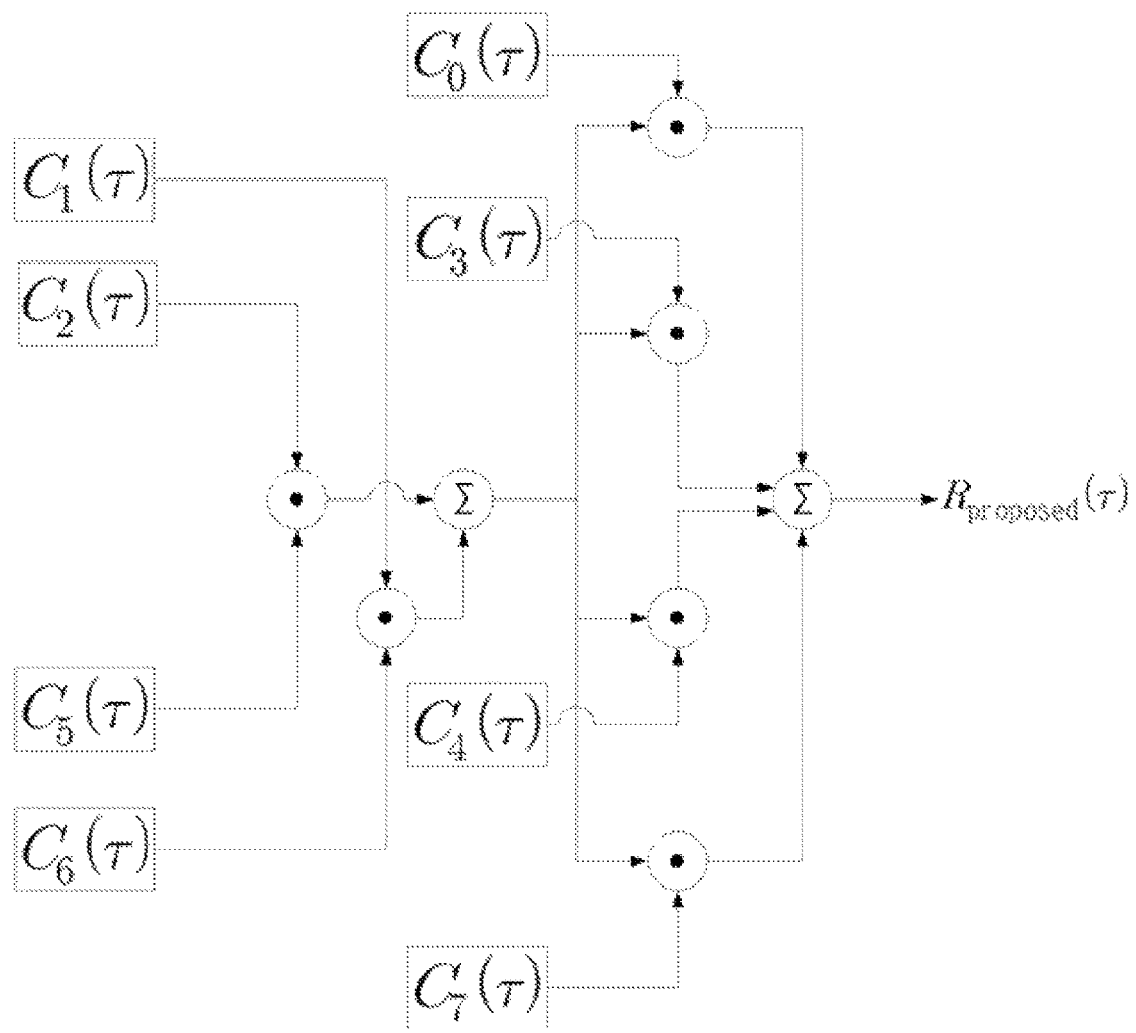
FIG. 4 is a diagram illustrating an example of a process of combining partial correlation functions for achieving a resultant correlation function.

FIG. 4 is a diagram illustrating an example of a process of combining partial correlation functions for achieving the resultant correlation function $R_{proposed}(\tau)$.

Figure 5:
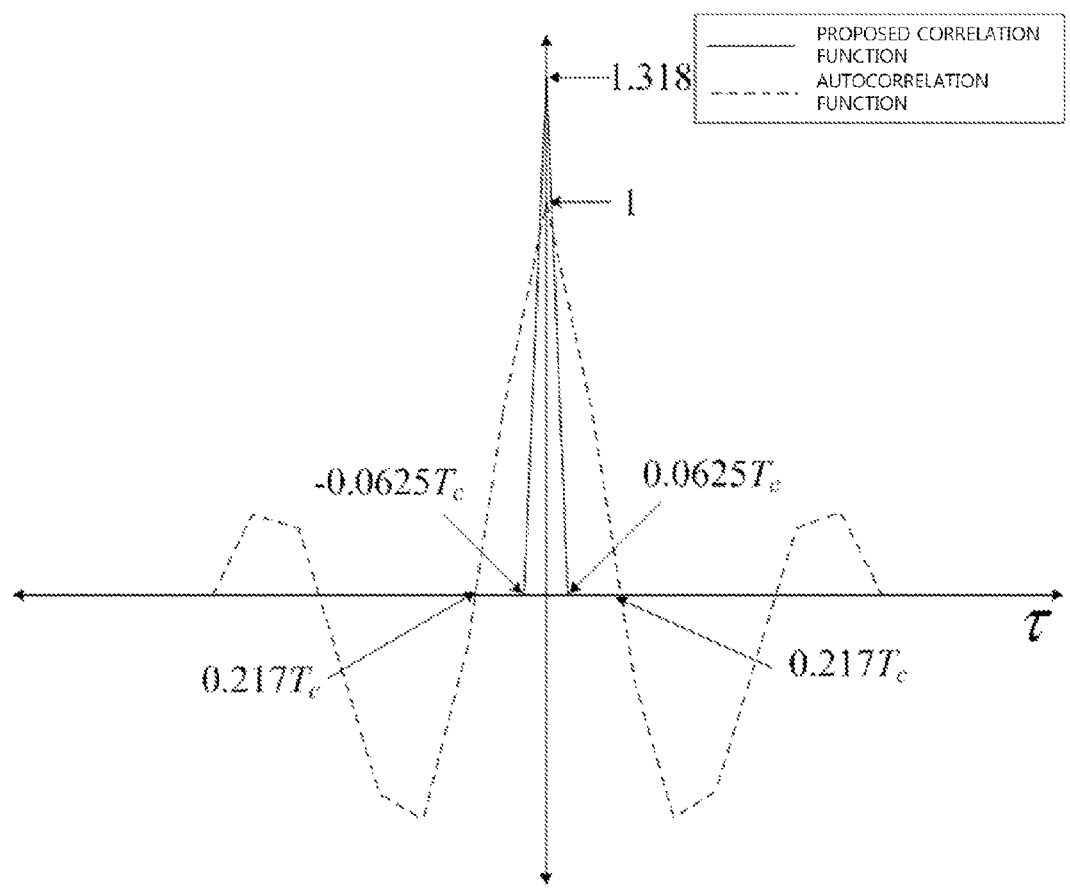
FIG. 5 is a diagram illustrating an example of a proposed resultant correlation function and an autocorrelation function of the related art.

FIG. 5 is an exemplary diagram illustrating the proposed resultant correlation function $R_{proposed}(\tau)$ and an autocorrelation function of the related art. It can be seen from FIG. 5 that the proposed resultant correlation function has no side peaks and a more pointed main peak, as compared with the autocorrelation function.

Output $D(\tau)$ of a discriminator for tracking an AltBOC signal can be expressed as the following Equation 8.

$$D(\tau) = R_{proposed}^2\left(\tau + \frac{\Delta}{2}\right) - R_{proposed}^2\left(\tau - \frac{\Delta}{2}\right) \quad \text{[Equation 8]}$$

where $\Delta$ is a displacement. The output of the discriminator operates until $\tau$ becomes zero by an oscillator numerically controlled in a delay lock loop and performs and keeps time synchronization.

TESD (tracking error standard deviation) performance of the AltBOC autocorrelation function and the proposed resultant correlation function was compared through simulation.

TESD is defined as $$\frac{\sigma}{G}\sqrt{2B_L T_I},$$

where $\sigma$ is standard deviation of $R_{proposed}(0)$, $B_L$ is a bandwidth of a loop filter, $T_I$ is integration time, and $$G = \left.\frac{dR_{proposed}(\tau)}{d\tau}\right|_{\tau=0}.$$

The simulation was performed under conditions of T=4 ms, $T_1$=T, $\Delta = 1/24[T_c]$, and $B_L$=1 Hz.

Figure 6:
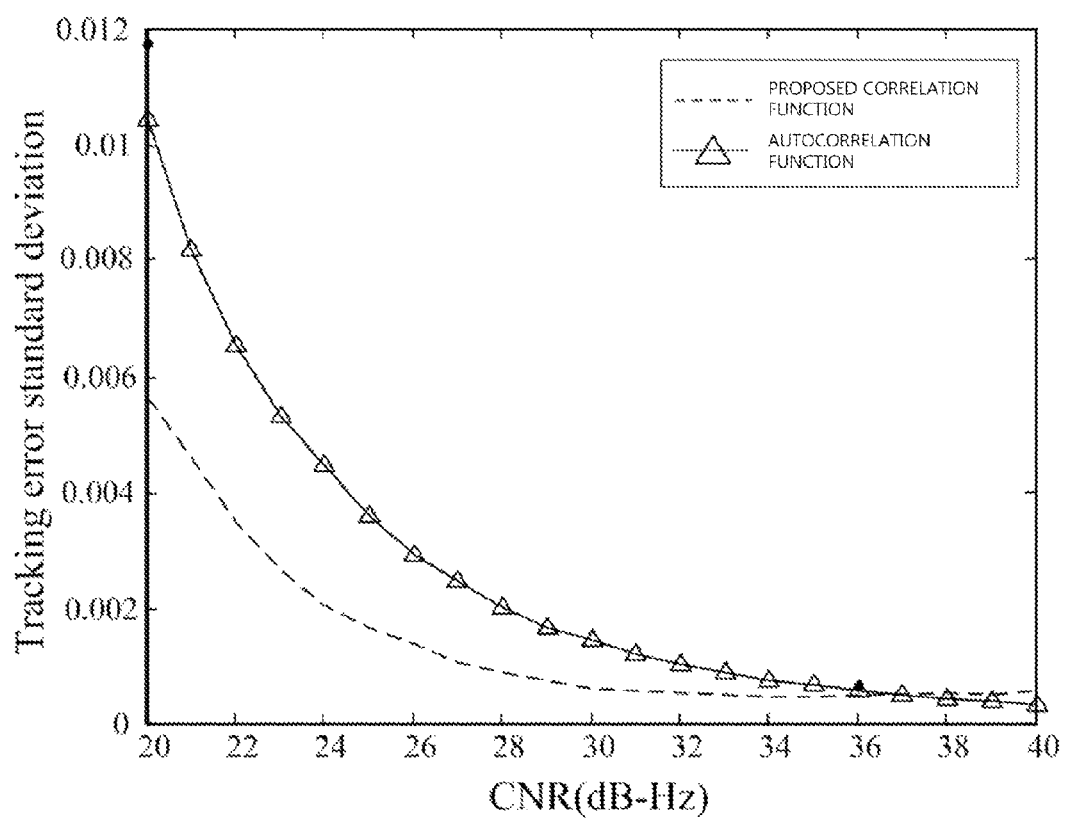
FIG. 6 is an example of a graph comparing TESD of an AltBOC autocorrelation function and a proposed resultant correlation function.

FIG. 6 is an exemplary graph comparing TESD of an AltBOC autocorrelation function and a proposed resultant correlation function. FIG. 6 illustrates TESD performance of an AltBOC autocorrelation function and a proposed resultant correlation function to CNR (carrier-to-noise ratio CNR) in an AltBOC signal. The CNR is defined as $P/N_0$ dB-Hz, in which $N_0$ is noise power spectral density.

Referring to FIG. 6, it can be seen the proposed resultant correlation function is higher in TESD than the autocorrelation function through the entire CNR. The proposed resultant correlation function exhibits higher performance at CNRs from zero to 36 dB-Hz, and then converges and exhibits performance similar to that of the autocorrelation function.

Figure 7:
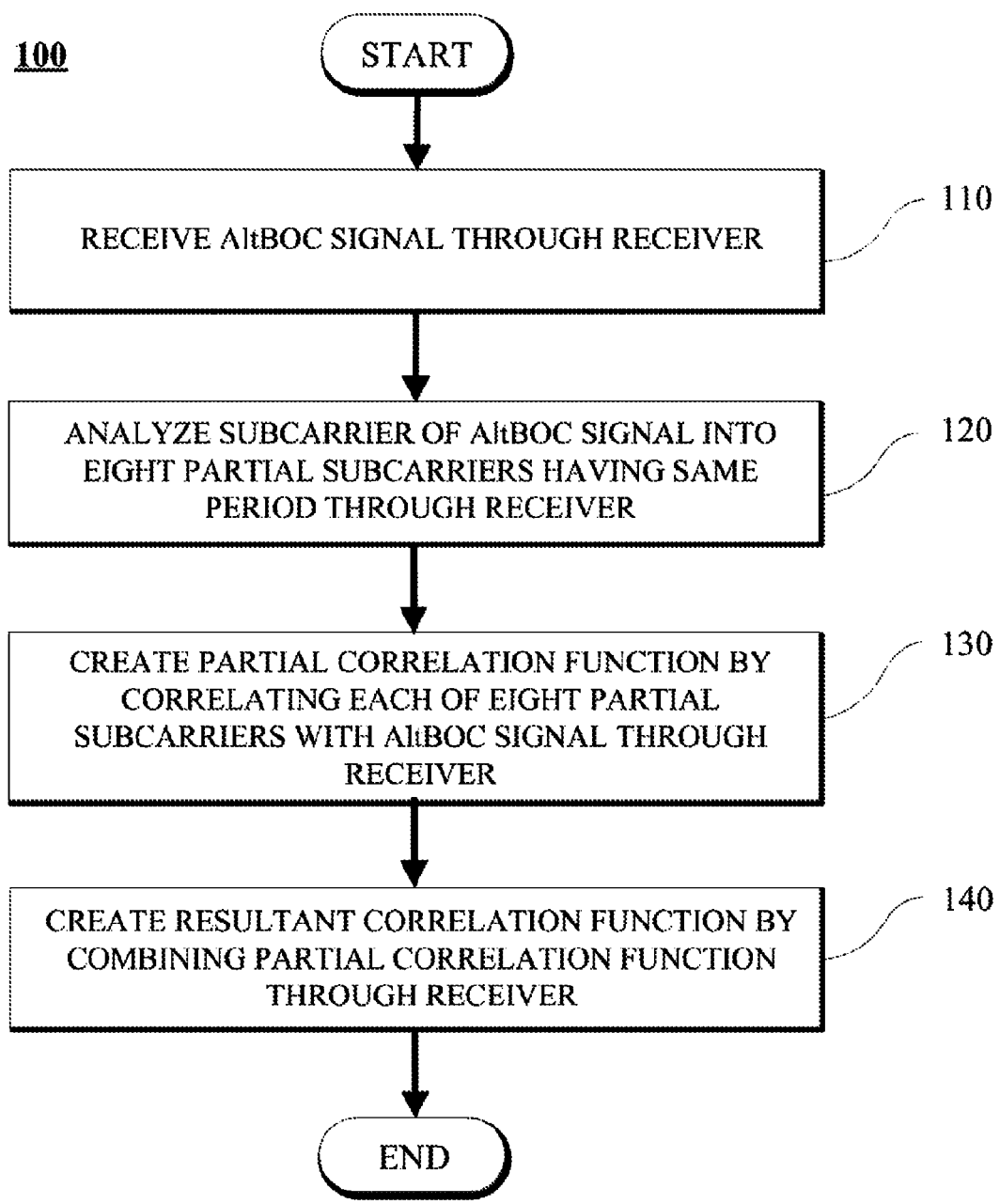
FIG. 7 is a flowchart illustrating an example of a method of creating an AltBOC correlation function.

FIG. 7 is a flowchart illustrating an example of a method 100 of creating an AltBOC correlation function.

The method 100 of creating an AltBOC correlation function includes: receiving an AltBOC signal by a receiver (110); analyzing a subcarrier of the AltBOC signal into eight partial subcarriers having the same period by the receiver (120); creating partial correlation functions by correlating each of the eight partial subcarriers with the AltBOC signal by the receiver (130); and creating a resultant correlation function by combining the partial correlation functions by the receiver (S140).

The receiver is a receiving terminal that receives an AltBOC signal, the process of receiving an AltBOC signal may be performed by a receiver such as an antenna, and the partial correlation functions and resultant correlation function may be created by a calculator, such as a processor, in the receiving terminal.

The analyzing of a subcarrier (120) analyzes an AltBOC subcarrier into eight partial subcarriers $s_i(t)$ by the receiver, as in Equation 3 described above.

In the creating of a correlation function (140), the receiver creates a correlation function with side peaks removed, by combining partial correlation functions, which are bilaterally symmetrical, in the partial correlation functions.

In the creating of a resultant correlation function (140), the receiver can create a resultant correlation function basically with side peaks removed by calculating $R_0(\tau) = (C_1(\tau) \odot C_6(\tau)) + (C_2(\tau) \odot C_5(\tau))$, as described above in detail.

Further, the receiver can create a resultant correlation function with a more pointed main peak by adding at least one of $R_1(\tau)$, $R_2(\tau)$, $R_3(\tau)$ and $R_4(\tau)$ calculated from Equation 6 to $R_0(\tau)$.

The receiver tracks the AltBOC signal using the finally calculated resultant correlation function.

Figure 8:
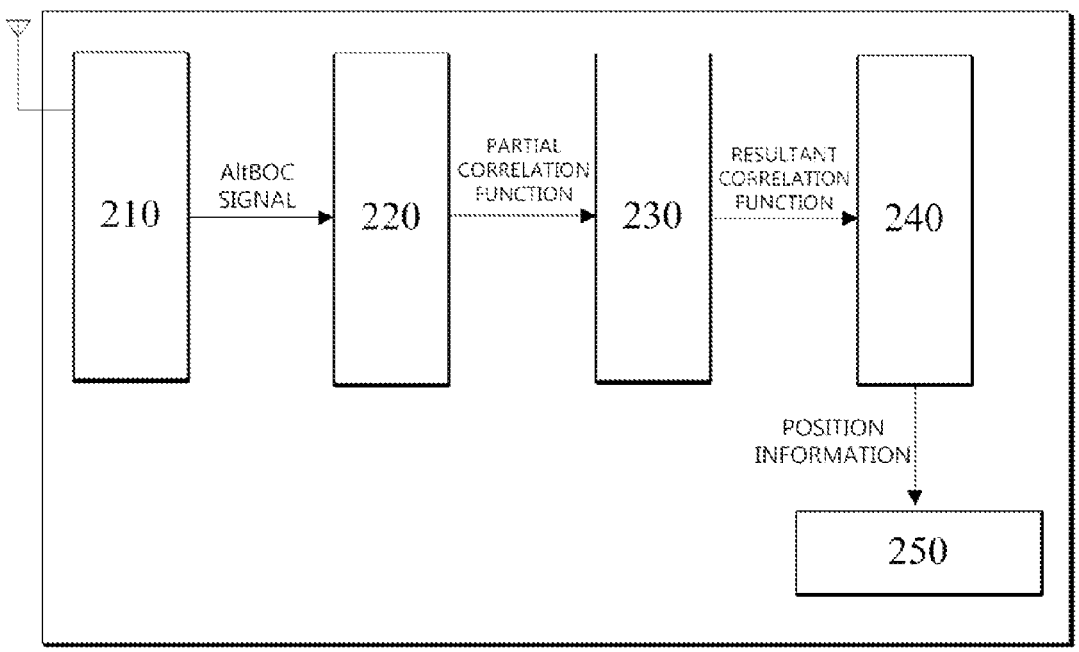
FIG. 8 is a block diagram illustrating an example of the configuration of a system for tracking an AltBOC signal.

FIG. 8 is a block diagram illustrating an example of the configuration of a system 200 for tracking an AltBOC signal.

The system 200 for tracking an AltBOC signal includes: a receiver 210 that receives an AltBOC signal; a partial correlation function creator 220 that analyzes a subcarrier of an AltBOC signal into eight partial subcarriers having the same period and creates partial correlation functions by correlating the eight partial subcarriers with the AltBOC signal; a resultant correlation function creator 230 that creates a resultant correlation function by combining the partial correlation functions; and a determiner 240 that tracks a signal using the resultant correlation function. Further, the system may further include a locator 250 that finds out a position using a signal tracked by the determiner.

The partial correlation function creator 220 analyzes the partial subcarrier $s_i(t)$, as in Equation 3 describe above.

The resultant correlation creator 230 removes side peaks by combining bilaterally symmetric functions of the partial correlation functions, as described above. The resultant correlation function creator 230 can creates a resultant correlation function basically with side peaks removed, by calculating $$R_0(\tau)=(C_1(\tau)\odot C_6(\tau))+(C_2(\tau)\odot C_5(\tau)).$$

Further, the resultant correlation function creator 230 can create a resultant correlation function with a more pointed main peak by adding at least one of $R_1(\tau)$, $R_2(\tau)$, $R_3(\tau)$, and $R_4(\tau)$ calculated from Equation 6 to $R_0(\tau)$.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of synchronizing an Alternative Binary Offset Carrier (AltBOC) signal using an AltBOC correlation function, comprising:
   receiving, by a receiver, an AltBOC signal;
   dividing, by the receiver, a subcarrier of the AltBOC signal into eight partial subcarriers having the same period;
   creating, by the receiver, partial correlation functions by correlating each of the eight partial subcarriers with the AltBOC signal;
   creating, by the receiver, a resultant correlation function by combining the partial correlation functions; and
   synchronizing, by the receiver, the AltBOC signal using the resultant correlation function.

2. The method of claim 1, wherein the partial subcarrier $s_i(t)$ is expressed as the following equation, $$s_i(t) = \sum_{k=-\infty}^{\infty} sc_{i_{mod(k,8)}} p_{T_c/8}\left(t - k\frac{T_c}{8}\right)$$

where i is an ordinal number of a partial subcarrier, $sc_i$ is the value of a subcarrier of an AltBOC signal, $p_{T_c/8}$ is a unit square wave for [0, $T_c/8$], $T_c$ is a chip period of a pseudorandom noise, and mod (k,8) is the remainder of k/8.

3. The method of claim 1, wherein, in the creating of a resultant correlation function, the receiver creates a correlation function with side peaks removed, by combining partial correlation functions, which are bilaterally symmetrical, in the partial correlation functions.

4. The method of claim 1, wherein, in the creating of a resultant correlation function, the receiver creates a correlation function $R_0$ with side peaks removed, using the following equation, $$R_0=(|C_3|+|C_4|-|C_3-C_4|)+(|C_2|+|C_5|-|C_2-C_5|)$$

where $C_i(\tau)$ and is the i-th partial correlation function.

5. The method of claim 4, wherein, in the creating of a resultant correlation function, the receiver creates the resultant correlation function by adding at least one of $R_1$, $R_2$, $R_3$, and $R_4$ calculated from the following equations to $R_0$:

$$R_1=(|R_0|+|C_6|-|R_0-C_6|),$$

$$R_2=(|R_0|+|C_3|-|R_0-C_3|),$$

$$R_3=(|R_0|+|C_4|-|R_0-C_4|),$$

$$R_4=(|R_0|+|C_7|-|R_0-C_7|),$$

6. A method of tracking an Alternative Binary Offset Carrier (AltBOC) signal using a receiver synchronizing the AltBOC signal, the method comprising:
   receiving an AltBOC signal by a receiver;
   analyzing, by the receiver, a subcarrier of the AltBOC signal into eight partial subcarriers having the same period;
   creating, by the receiver, partial correlation functions by correlating the eight partial subcarriers with the AltBOC signal;
   creating, by the receiver, a resultant correlation function by combining the partial correlation functions; and
   tracking, by the receiver, the AltBOC signal using the resultant correlation function.

7. The method of claim 6, wherein the partial subcarrier $S_i(t)$ is expressed as the following equation, $$s_i(t) = \sum_{k=-\infty}^{\infty} sc_{i_{mod(k,8)}} p_{T_c/8}\left(t - k\frac{T_c}{8}\right)$$

where i is an ordinal number of a partial subcarrier, $sc_i$ is the value of a subcarrier of an AltBOC signal, $p_{T_c/8}$ is a unit square wave for [0, $T_c/8$], $T_c$ is a chip period of a pseudorandom noise, and mod(k,8) is the remainder of k/8.

8. The method of claim 6, wherein, in the creating of a resultant correlation function, the receiver creates a resultant correlation function $R_0$ with side peaks removed, using the following equation, $$R_0=(|C_3|+|C_4|-|C_3-C_4|)+(|C_2|+|C_5|-|C_2-C_5|)$$

where $C_i(\tau)$ and is the i-th partial correlation function.

9. The method of claim 8, wherein, in the creating of a resultant correlation function, the receiver creates the resultant correlation function by adding at least one of $R_1$, $R_2$, $R_3$, and $R_4$ calculated from the following equations to $R_0$:

$$R_1=(|R_0|+|C_6|-|R_0-C_6|),$$

$$R_2=(|R_0|+|C_3|-|R_0-C_3|),$$

$$R_3=(|R_0|+|C_4|-|R_0-C_4|),$$

$$R_4=(|R_0|+|C_7|-|R_0-C_7|),$$

10. A system for tracking an Alternative Binary Offset Carrier (AltBOC) signal by synchronizing the AltBOC signal, the system comprising:

a receiver configured to receive an AltBOC signal;

a partial correlation function creator configured to analyze a subcarrier of an AltBOC signal into eight subcarriers having the same period and create partial correlation functions by correlating the eight partial subcarriers with the AltBOC signal;

a resultant correlation function creator configured to create a resultant correlation function by combining the partial correlation functions; and a determiner configured to track a signal using the resultant correlation function.

11. The system of claim 10, wherein the partial correlation function creator analyzes the partial subcarriers, as in the following equation, $$s_i(t) = \sum_{k=-\infty}^{\infty} sc_{i_{mod(k,8)}} p_{T_c/8}\left(t - k\frac{T_c}{8}\right)$$

where i is an ordinal number of a partial subcarrier, $sc_i$ is the value of a subcarrier of an AltBOC signal, $p_{T_c/8}$ is a unit square wave for $[0, T_c/8]$, $T_c$ is a chip period of a pseudorandom noise, and mod(k,8) is the remainder of k/8.

12. The system of claim 10, wherein the resultant correlation function creator creates a resultant correlation function $R_0$ with side peaks removed, using the following equation, $$R_0 = (|C_3| + |C_4| - |C_3 - C_4|) + (|C_2| + |C_5| - |C_2 - C_5|)$$

where $C_i(\tau)$ and is the i-th partial correlation function.

13. The system of claim 10, wherein the resultant correlation function creator creates the resultant correlation function $R_{proposed}$ with side peaks removed, using the following equation, $$R_{proposed} = \sum_{i=0}^{4} R_i$$

where $R_0 = (|C_3| + |C_4| - |C_3 - C_4|) + (|C_2| + |C_5| - |C_2 - C_5|)$, $R_1 = (|R_0| + |C_6| - |R_0 - C_6|)$, $R_2 = (|R_0| + |C_3| - |R_0 - C_3|)$, $R_3 = (|R_0| + |C_4| - |R_0 - C_4|)$, $R_4 = (|R_0| + |C_7| - |R_0 - C_7|)$, and $C_i(\tau)$ is the i-th partial correlation function.

* * * * *